Sept. 25, 1934.　　　G. A. KELLY　　　1,975,044
MEAT SKINNER
Filed Aug. 26, 1932　　　2 Sheets-Sheet 1
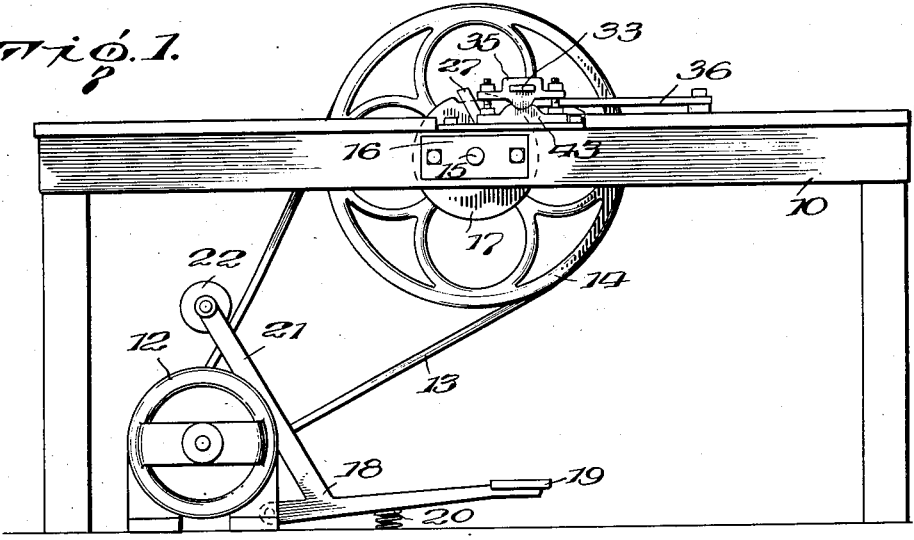
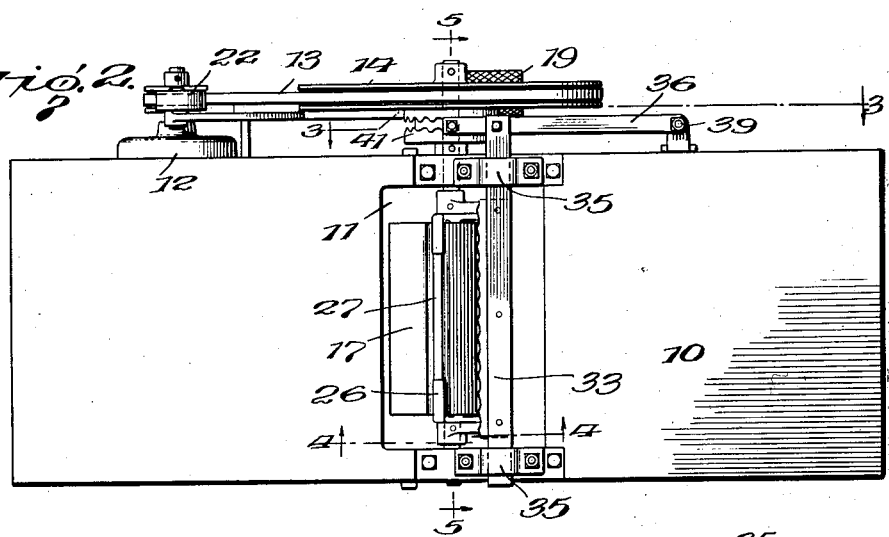
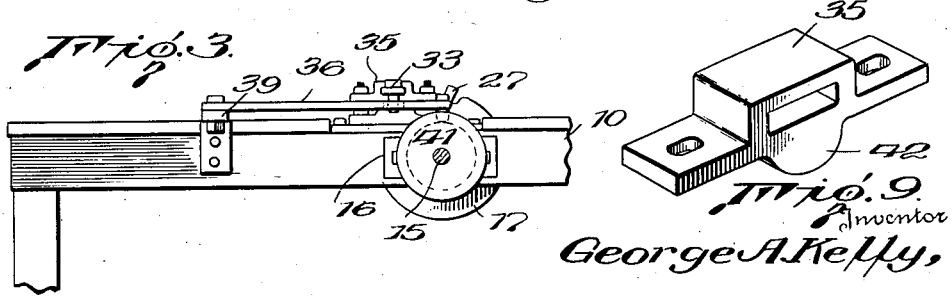
Inventor
George A. Kelly,
By Bernard F. Harvey
Attorney Sept. 25, 1934.  G. A. KELLY  1,975,044
MEAT SKINNER
Filed Aug. 26, 1932   2 Sheets-Sheet 2
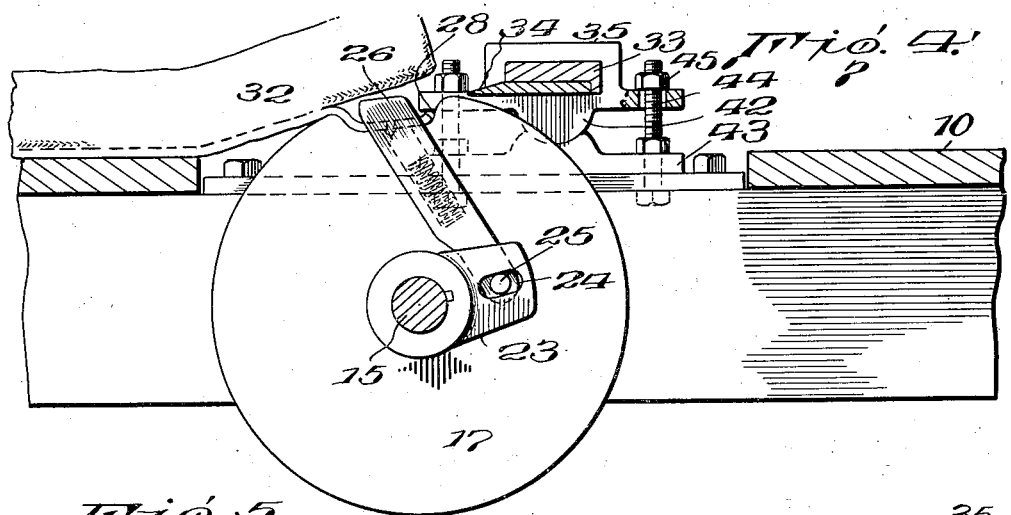
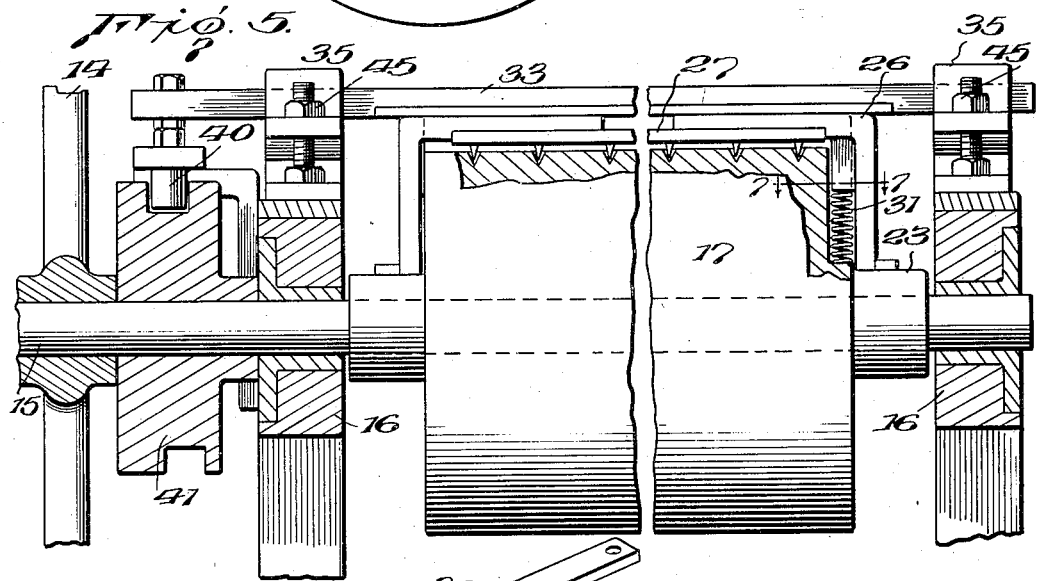
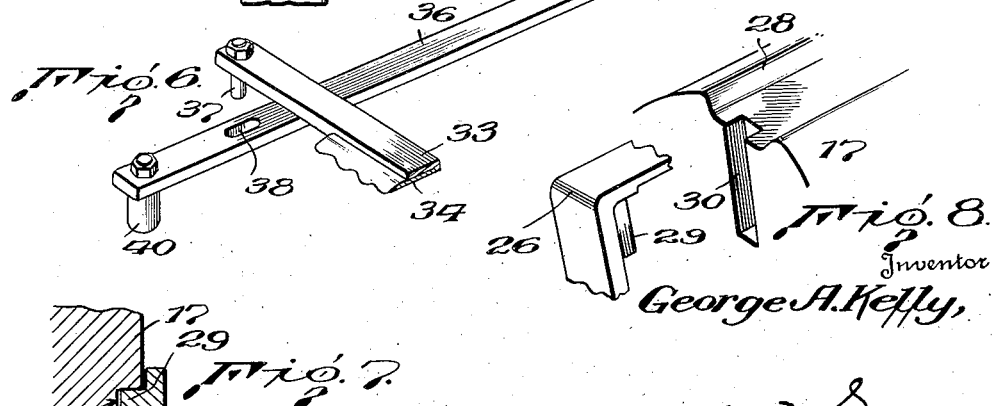
Inventor
George A. Kelly,
By Bernard F. Garvey
Attorney Patented Sept. 25, 1934

1,975,044

UNITED STATES PATENT OFFICE 1,975,044

MEAT SKINNER

George A. Kelly, Baltimore, Md.

Application August 26, 1932, Serial No. 630,587

3 Claims. (Cl. 146—130)

The present invention contemplates a meat skinning machine, in which the skin of the meat is effectively and completely severed from the adhering meat in a manner which eliminates the possibility of cutting into the skin during the severance of the latter.

An object of the invention is to provide an automatic clamping means for the meat which becomes effective upon the application of power to the meat holder for positively holding the meat in a fixed position during the severing operation, the skin being automatically released from its holder when the power is cut off from the latter.

The meat skinner of the present invention embodies a knife with an irregular relatively blunt cutting edge, which operates to sever the skin as contra-distinguished to a direct cutting action, the knife being adjustable to permit the severance of skins varying in thickness.

It is well known in the art to provide meat skinners, most of which employ a knife which is usually fixed and provided with a very sharp cutting edge, which passes through the meat in proximity to the skin while pressure is exerted on the latter to urge the meat through the knife. It has been found that by following this method, the knife very often cuts deep into the meat and furthermore, cuts into the skin. It is therefore, the purport of the present invention to provide a suitable movable meat holder which advances the meat and at the same time to employ a movable cutter having a relatively dull edge in order to effect severance of the skin from the meat by the reciprocation of the knife with a complete absence of a direct cutting operation, the knife being operated by the same means used to impart motion to the meat holder.

Various other objects of the invention will be apparent from the following description of the present preferred form of the device, taken in connection with the accompanying drawings, wherein Fig. 1 is a side elevational view of a complete meat skinning machine constructed in accordance with the present invention;

Fig. 2 is a top plan view thereof;

Fig. 3 is a detail fragmentary, sectional view, taken on the line 3—3 of Fig. 2, looking in the direction of the arrows;

Fig. 4 is a similar view, taken on the line 4—4 of Fig. 2, looking in the direction of the arrows;

Fig. 5 is a transverse sectional view, taken on the line 5—5 of Fig. 2, looking in the direction of the arrows;

Fig. 6 is a detail perspective view of the power link and cutter bar showing the manner in which they are connected, the cutter bar being shown in section;

Fig. 7 is a fragmentary sectional view, taken on the line 7—7 of Fig. 5;

Fig. 8 is a detail fragmentary, perspective view of the drum and meat clamping bracket, showing to advantage the means employed for keying the drum and clamp together while the drum is in operation; and Fig. 9 is a perspective view of one of the cutter bar supporting brackets.

The present invention includes a table 10, which may be provided approximately midway its ends with an opening 11, the table in the present instance being shown to be of oblong configuration and adapted to be supported on a base through the medium of legs providing a space beneath the table for the accommodation of motive means for the meat skinner.

In the present instance I prefer to employ motive means of conventional design and in Fig. 1 of the drawings show a motor 12 which operates a belt 13, said belt being trained about a pulley 14, which latter is keyed to a shaft 15. The shaft is journaled in suitable bearings 16 carried by the opposite sides of the table and is equipped with a meat holding drum 17, the periphery of the drum protruding through the opening 11 in the table top. Movement of the motor 12 is ineffective to operate the drum 17 until tension is exerted upon the belt 13 and I therefore mount beneath the table suitable tensioning means generally designated 18. The tensioning means includes a foot pedal 19, which is normally held in an elevated position by a spring 20 and also includes an arm 21, in which a tensioning roller 22 is journaled. When pressure is exerted upon the pedal 19 the roller 22 is urged into frictional engagement with the belt 13 to thereby operatively connect the motor and drum 17 in a manifest manner.

Keyed to the shaft 15, at each end of the drum 17, is a cam 23 which is provided with an elongated slot 24. The slots of the cams are adapted for the reception of pins 25 formed on the opposite terminals of a meat clamping bracket generally designated 26, the latter including a toothed bar 27, the teeth of which are adapted for engagement in complemental openings formed in the bottom wall of a recess 28 which extends longitudinally through the periphery of the drum, as illustrated to advantage in Fig. 4. For the purpose of locking the clamping bracket 26 to the drum 17, I provide keys 29 mounted on the inner walls of the opposite ends of the bracket 26, which keys are adapted for slidable engagement in slots 30, formed in the opposite ends of the drum 17 in communication with the longitudinal recess 28. Normally the bracket is urged outwardly from the recess 28 by springs 31, which are mounted in the recesses 30 of the drum and engage the keys 29, as illustrated to advantage in Fig. 5.

The clamp 26 is engaged with a partially severed end of a skin on meat, as shown at 32 in Fig. 4 of the drawings, and as the drum rotates the meat is advanced over the top of the drum in an apparent manner. The present invention includes suitable skin severing means mounted in the path of movement of the meat in order to impinge the latter in the bight between the meat and skin. The severing means employed for this purpose in the present invention consists of a cutter bar 33 to which a cutter blade 34 is secured in any desired manner, one end of the bar being slidably engaged through a loop bracket 35, which is mounted on the table top at one end of the opening 11 of the latter. The opposite end of the bar is slidably mounted beneath a similar bracket at the opposite side of the table top and projects therebeyond for engagement with a power link 36 through the medium of a connecting pin 37. The pin 37 may be detachably mounted in the terminal of the bar 33 and engages an elongated slot 38 formed in the link 36. One end of the link 36 is pivotally engaged with one side of the table as indicated at 39 and shown to advantage in Figs. 2 and 3. The opposite end of the link carries a roller 40 which is mounted in an enclosed cam 41 which latter is fixedly mounted on the shaft 15.

It is desired to permit adjustment of the cutter bar 33 in order to accommodate skins varying in thickness and with this end in view, each of the brackets 35 is formed to provide a semi-circular base 42, which is seated in a corresponding opening formed in the top of a plate 43 mounted on the table, subjacent the loop bracket 35. The plates 43 and brackets 35 are detachably engaged to the table by bolts 44. Manifestly, release of the nuts 45 carried by said bolts will permit tilting of the cutter bar 33, correspondingly tilting or canting the brackets 35 until the desired point of adjustment is reached pursuant to which the nuts are urged into engagement with the brackets.

It is apparent from the above that the skin is first cut from one end of the meat to provide a starting portion which is engaged beneath the clamp 26 and motion is imparted to the drum 17 by exerting pressure on the foot pedal 19. Simultaneously the cutter bar 33 is reciprocated and the skin severed from the meat in an obvious manner. As soon as pressure is released from the foot pedal the skin clamp is automatically disengaged from the drum.

While I have herein shown a preferred form of my invention, it is nevertheless to be understood that various changes may be made therein, in the construction proportion and arrangement of parts, within the scope of the appended claims.

What is claimed is:

1. A meat skinner including a support, a drum rotatably mounted in said support and provided with a recess co-extensive with the length of the latter, a meat clamping bracket eccentrically mounted on the drum axis for urging one end of the meat skin into the drum recess, a cam operatively engageable with the drum and movable with the latter, a link, one end of which is engaged with said support and the opposite end engaged with said cam for oscillation by the latter, and a meat severer on said support in close proximity to the drum, having one end engaged with the link.

2. A meat skinner including a table equipped with a drum, a U-shaped toothed bracket on the drum the legs of which are parallel to the ends of the drum, means to operate the drum and bracket for clamping one end of the skin into snug engagement with the drum, keys on the bracket legs engageable with said drum for locking the drum and bracket together, and a knife mounted on the table in the path of the meat for severing the skin from the latter.

3. A meat skinner including a table equipped with a meat supporting drum with terminal recesses, a toothed bracket on the drum, means for operating the drum and bracket for clamping one end of the skin into engagement with the drum, keys on the bracket engageable in the recesses of the drum for locking the drum and bracket together, springs in said recesses in engagement with the keys to urge the bracket outwardly from the drum when the operating means of the latter is released, and a knife mounted on the table in the path of the meat for severing the skin from the latter.

GEORGE A. KELLY.